(12) United States Patent
Chen et al.

(10) Patent No.: US 11,483,493 B2
(45) Date of Patent: Oct. 25, 2022

(54) CAMERA IMAGE CONVERSION METHOD CAPABLE OF REDUCING PROCESSING TIME

(71) Applicant: WELTREND SEMICONDUCTOR INC., Hsinchu (TW)

(72) Inventors: Hsuan-Ying Chen, Hsinchu (TW); Chun-Ting Lin, Hsinchu (TW); Hsiu-Yuan Fan, Hsinchu (TW); Chi-Cheng Cheng, Hsinchu (TW); Hung-Chih Chiang, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 236 days.

(21) Appl. No.: 16/953,353

(22) Filed: Nov. 20, 2020

(65) Prior Publication Data

US 2022/0046185 A1    Feb. 10, 2022

(30) Foreign Application Priority Data

Aug. 5, 2020 (TW) ................. 109126464

(51) Int. Cl.
*H04N 5/262* (2006.01)
*G06T 1/60* (2006.01)
*G06T 3/00* (2006.01)

(52) U.S. Cl.
CPC ............ *H04N 5/2628* (2013.01); *G06T 1/60* (2013.01); *G06T 3/0012* (2013.01); *G06T 3/0093* (2013.01)

(58) Field of Classification Search
None
See application file for complete search history.

(56) References Cited

U.S. PATENT DOCUMENTS

| | | | | |
|---|---|---|---|---|
| 5,119,080 A | * | 6/1992 | Kajimoto | G09G 5/14 |
| | | | | 345/620 |
| 5,760,793 A | * | 6/1998 | Ellert | G09G 5/393 |
| | | | | 345/547 |
| 7,194,141 B1 | * | 3/2007 | Bao | G06T 3/4023 |
| | | | | 382/254 |
| 7,619,626 B2 | * | 11/2009 | Bernier | G06T 15/205 |
| | | | | 345/639 |
| 7,808,503 B2 | * | 10/2010 | Duluk, Jr. | G06T 15/30 |
| | | | | 345/506 |
| 8,340,462 B1 | * | 12/2012 | Gigushinski | G06T 3/0093 |
| | | | | 348/E3.043 |
| 9,648,234 B2 | * | 5/2017 | Hsieh | H04N 5/23238 |
| 9,984,494 B2 | * | 5/2018 | Pylvaenaeinen | G06T 15/04 |
| 10,198,788 B2 | * | 2/2019 | Baker | G06T 1/60 |

(Continued)

FOREIGN PATENT DOCUMENTS

TW    201427389 A    7/2014
TW    202029134 A    8/2020

*Primary Examiner* — Anand P Bhatnagar
(74) *Attorney, Agent, or Firm* — Winston Hsu

(57) ABSTRACT

A method of image conversion includes selecting a set of pixels from a source image, storing the set of pixels in a memory, determining whether the set of pixels includes at least one pixel requiring coordinate conversion by querying a predetermined mapping table, if the set of pixels includes the at least one pixel requiring coordinate conversion, converting the coordinates of the at least one pixel, and after converting the coordinates of the at least one pixel, removing the set of pixels from the memory.

14 Claims, 7 Drawing Sheets

(56) References Cited

U.S. PATENT DOCUMENTS

| | | | | |
|---|---|---|---|---|
| 2006/0132491 A1* | 6/2006 | Riach | ...................... | G09G 5/363 |
| | | | | 345/505 |
| 2014/0184814 A1* | 7/2014 | Lin | ...................... | H04N 17/002 |
| | | | | 348/187 |
| 2019/0379910 A1* | 12/2019 | Shen | ........................ | G06F 3/011 |

* cited by examiner

CAMERA IMAGE CONVERSION METHOD CAPABLE OF REDUCING PROCESSING TIME

BACKGROUND OF THE INVENTION

1. Field of the Invention

The present invention is related to a method of image conversion, more particularly to a method of camera image conversion to reduce processing time and complexity.

2. Description of the Prior Art

Cameras are often used for auxiliary driving devices and road monitoring systems. The camera images can be integrated and converted to images with different visual angles to help with surveillance. It is necessary to perform image distortion correction and visual angle conversion to properly display bird's-eye view images. In general, image distortion correction and visual angle conversion method of the prior art depends heavily on memory and computing resources. As a result, it often causes time delay in displaying camera image in real time. Therefore, an image conversion method that can reduce the complexity of image processing and achieve real-time display is needed.

SUMMARY OF THE INVENTION

An embodiment provides a method of image conversion. The method includes selecting a first set of pixels from a first source image, storing the first set of pixels in a memory, determining whether the first set of pixels comprises at least one first pixel requiring coordinate conversion by querying a first predetermined mapping table, if the first set of pixels comprises the at least one first pixel requiring coordinate conversion, converting the coordinates of the at least one first pixel, and after converting the coordinates of the at least one first pixel, removing the first set of pixels from the memory.

Another embodiment provides another method of image conversion. The method includes selecting a first set of pixels from a first source image, storing the first set of pixels in a memory, determining whether the first set of pixels comprises at least one first pixel requiring coordinate conversion by querying a first predetermined mapping table, if the first set of pixels does not comprise any first pixel requiring coordinate conversion, removing the first set of pixels from the memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
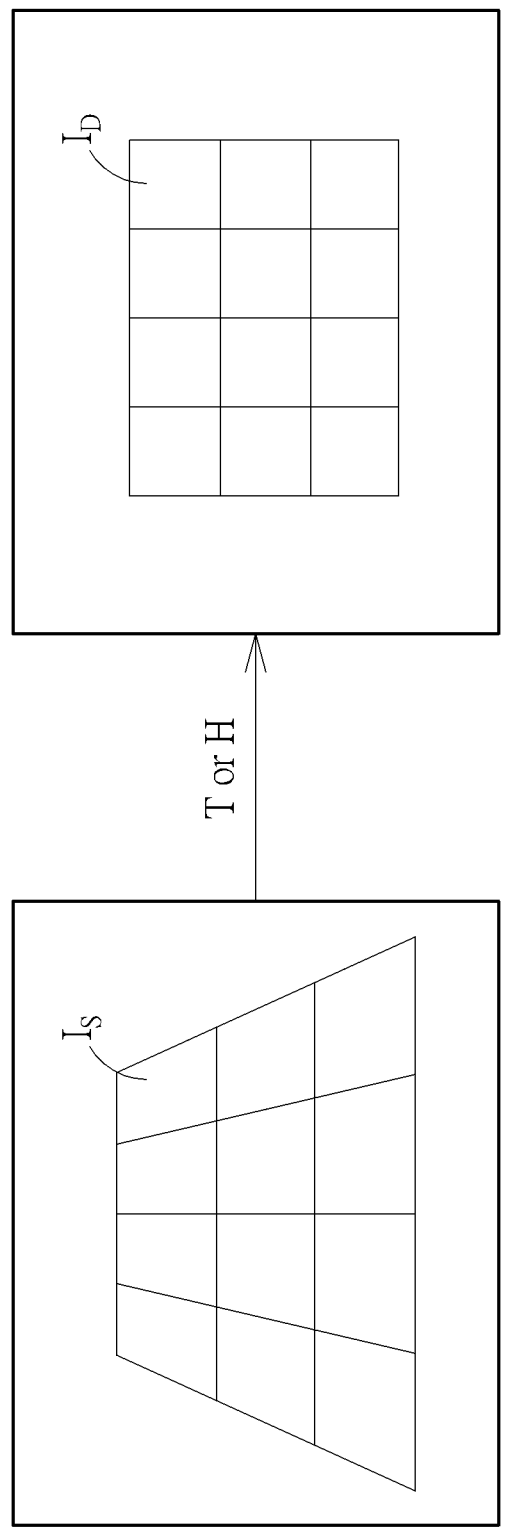
FIG. 1 is a diagram of image conversion of an embodiment of the present invention.

FIG. 1 is a diagram of image conversion of an embodiment of the present invention. The source image $I_S$ can be converted into a target image $I_D$ through a mapping table T or a homography matrix H. In general, a computer system can first store the entire source image $I_S$ into the memory, and then the processor converts the source image $I_S$ into the target image $I_D$ by the mapping table T or the homography matrix H. Among them, the mapping table T or the homography matrix H can be established and stored in the computer system before the conversion process. However, storing the entire image in the memory takes up a lot of memory space, which may exceed the size of the buffer memory of a processor. Hence, the computer system must use some low speed memory, such as DRAM (dynamic random access memory), to temporarily store the source image $I_S$. As a result, it may create an efficiency bottleneck for the processor to convert the images.

The embodiment divides the source image $I_S$ into blocks, and each block is a set of pixels. This set of pixels can be directly input into the processor, and can be completely accessed from the processor's register and/or high speed cache memory. The processor does not need to access low speed memory when performing image conversion, thereby speeding up the processor accessing the images and increasing the overall processing speed.

Figure 2:
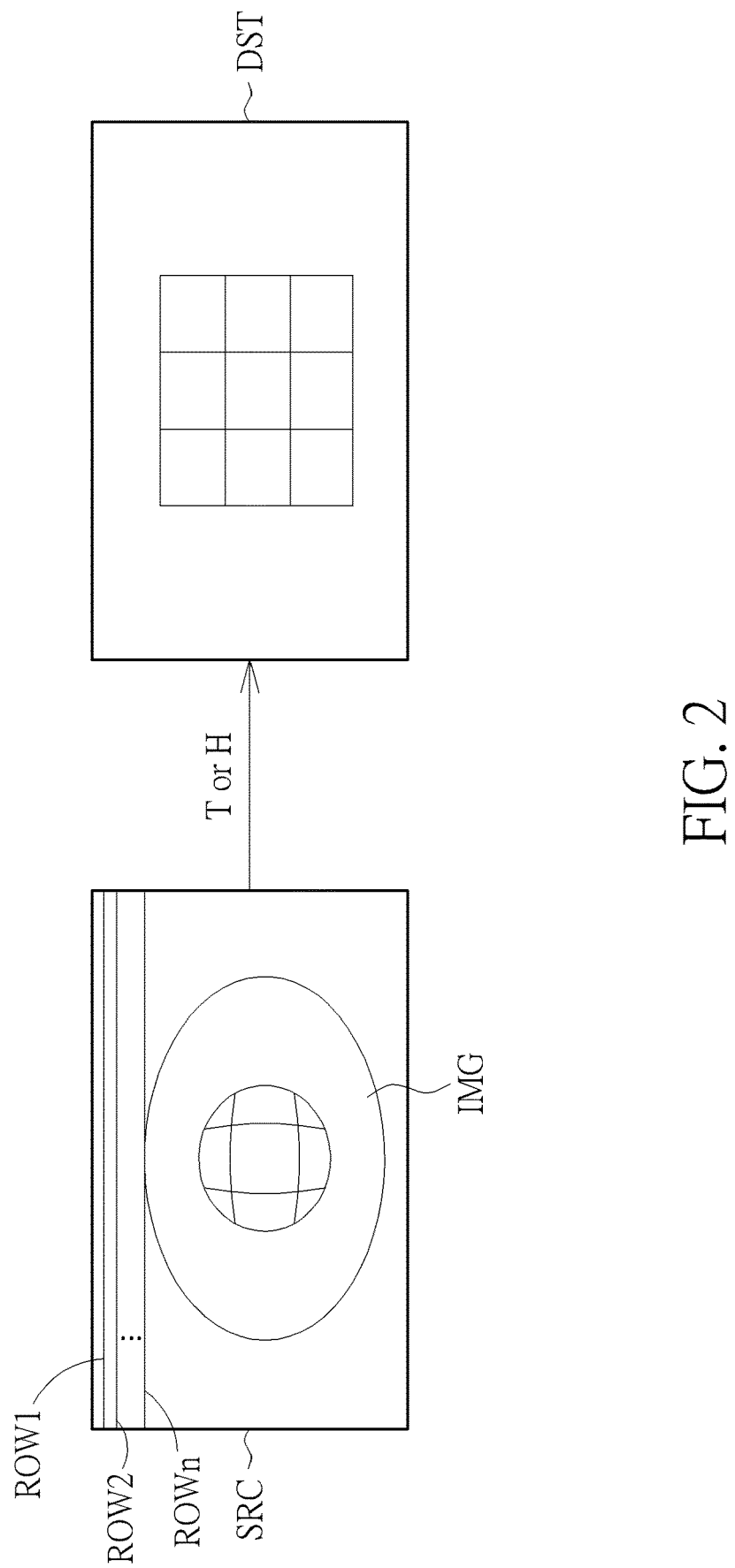
FIG. 2 is an exemplary diagram of a source image being converted to a target image of the embodiment.

FIG. 2 is a diagram of a source image SRC being converted to a target image DST of an embodiment. The source image SRC may have 1920×1080 pixels, for example, and a picture IMG is an elliptical part of the source image SRC, which is part that requires coordinate conversion. In an embodiment, the computer system can first select a row of pixels ROW1 at the top of the source image SRC, and input the row of pixels ROW1 to the processor. The row of pixels ROW1 can be directly stored in the high speed memory of the processor, such as a register or a cache memory. Then, the computer system can check whether the row of pixels ROW1 includes any pixel that needs coordinate conversion by querying the mapping table T. From FIG. 2, it shows that the row of pixels ROW1 does not include any part of the picture IMG, so there is no pixel in the row of pixels ROW1 that requires coordinate conversion. Then, the row of pixels ROW1 can be directly removed from the processor's memory.

Then, the computer system can input another row of pixels ROW2 below ROW1 into the processor, and query the mapping table T in the same way to determine whether the row of pixels ROW2 includes pixels requiring coordinate conversion. In this case, the row of pixels ROW2 also does not include any part of the picture IMG. As the result, the row of pixels ROW2 would be directly removed from the processor's memory as well.

When another row of pixels ROWn is input to the processor, because the row of pixels ROWn including a part of the picture IMG, the computer system by querying the mapping table T would detect that the row of pixels ROWn includes pixels requiring coordinate conversion. Then, the computer system can use the mapping table T or the homography matrix H to perform coordinate conversion on the row of pixels ROWn to output the coordinate-converted pixels to the target image DST. After completing coordinate conversion on the row of pixels ROWn, the computer system would remove the row of pixels ROWn from the memory.

The computer system can repeat the above process until coordinate conversion has been performed on all pixels in the picture IMG. In addition, the present invention is not limited to dividing the source image SRC into rows of pixels. The source image SRC can also be divided into blocks of pixels, columns of pixels, or single pixel for inputting to the processor.

Figure 3:
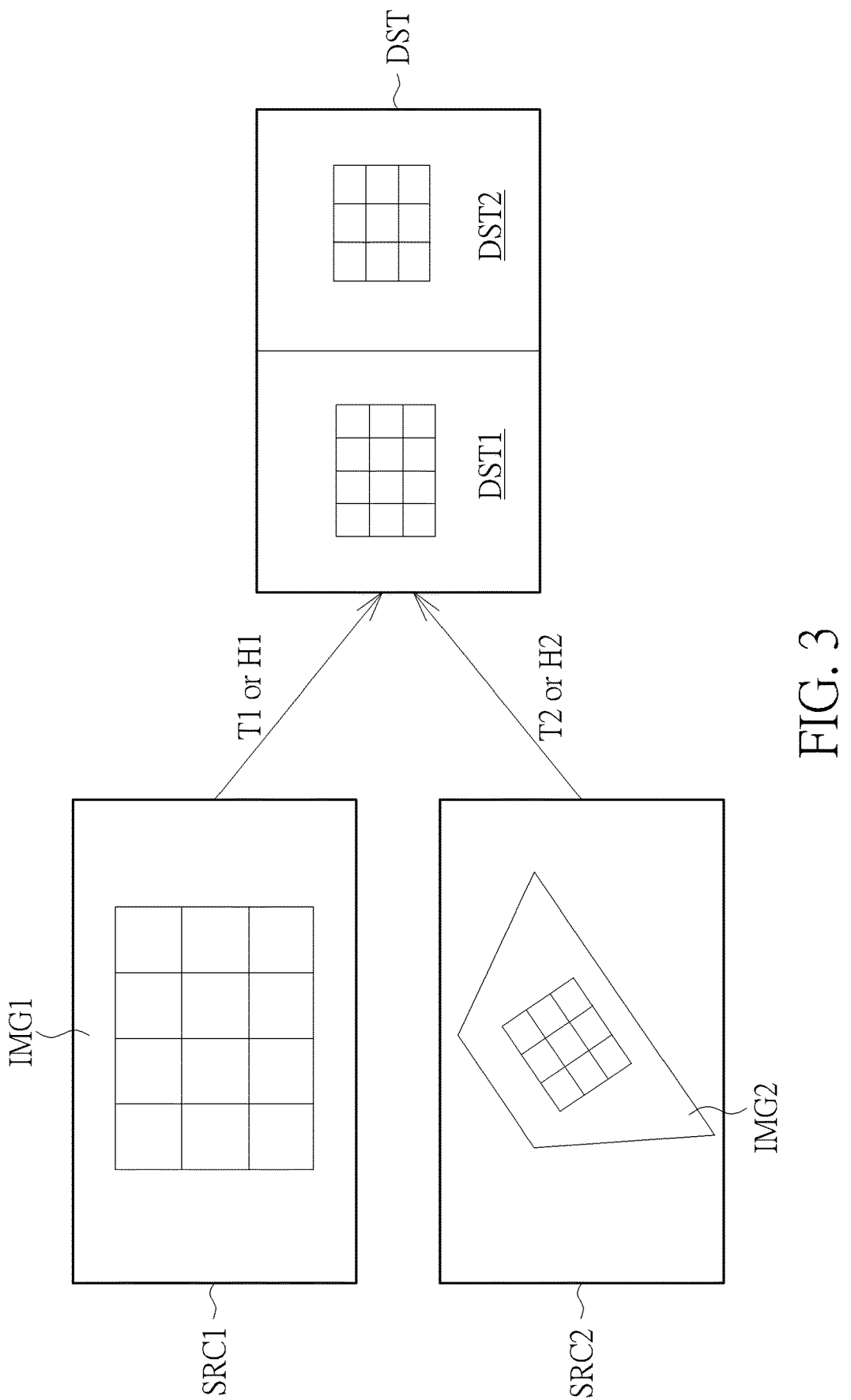
FIG. 3 is an exemplary diagram of converting multiple source images to a target image of the embodiment.

FIG. 3 is a diagram of converting multiple source images SRC1 and SRC2 to a target image of the embodiment. The source image SRC1 and the source image SRC2 may each include 1920×1080 pixels. In the embodiment, the picture IMG1, as the part of the source image SRC1, requires coordinate conversion and it includes the entire source image SRC1. The picture IMG2, as the part of the source image SRC2, requiring coordinate conversion is the trapezoidal part of the source image SRC2. The computer system can convert the source images SRC1 and SRC2 with the same method, and can output the target image DST including 1920×1080 pixels.

The source image SRC1 is converted by using a mapping table T1 or a homography matrix H1 and then output to the left side of the target image DST1. The source image SRC2 is converted by a mapping table T2 or a homography matrix H2 and then output to the right side of the target image DST2. The pixel coordinates of the source image SRC1 and the pixel coordinates of the source image SRC2 can be input to the processor for conversion simultaneously. The rest of the image conversion process is the same as the above description, and will not be repeated here. In addition, the embodiment is not limited to the source images SRC1 and SRC2. The method can be applied to converting more source images to a target image. Also, the division of the target image is not limited to the same size on the left and right; the target image can be split in any form. Moreover, the target image can be multiple virtual image planes, and the number of virtual image planes in the target image does not need to be the same as the number of source images.

Figure 4A:
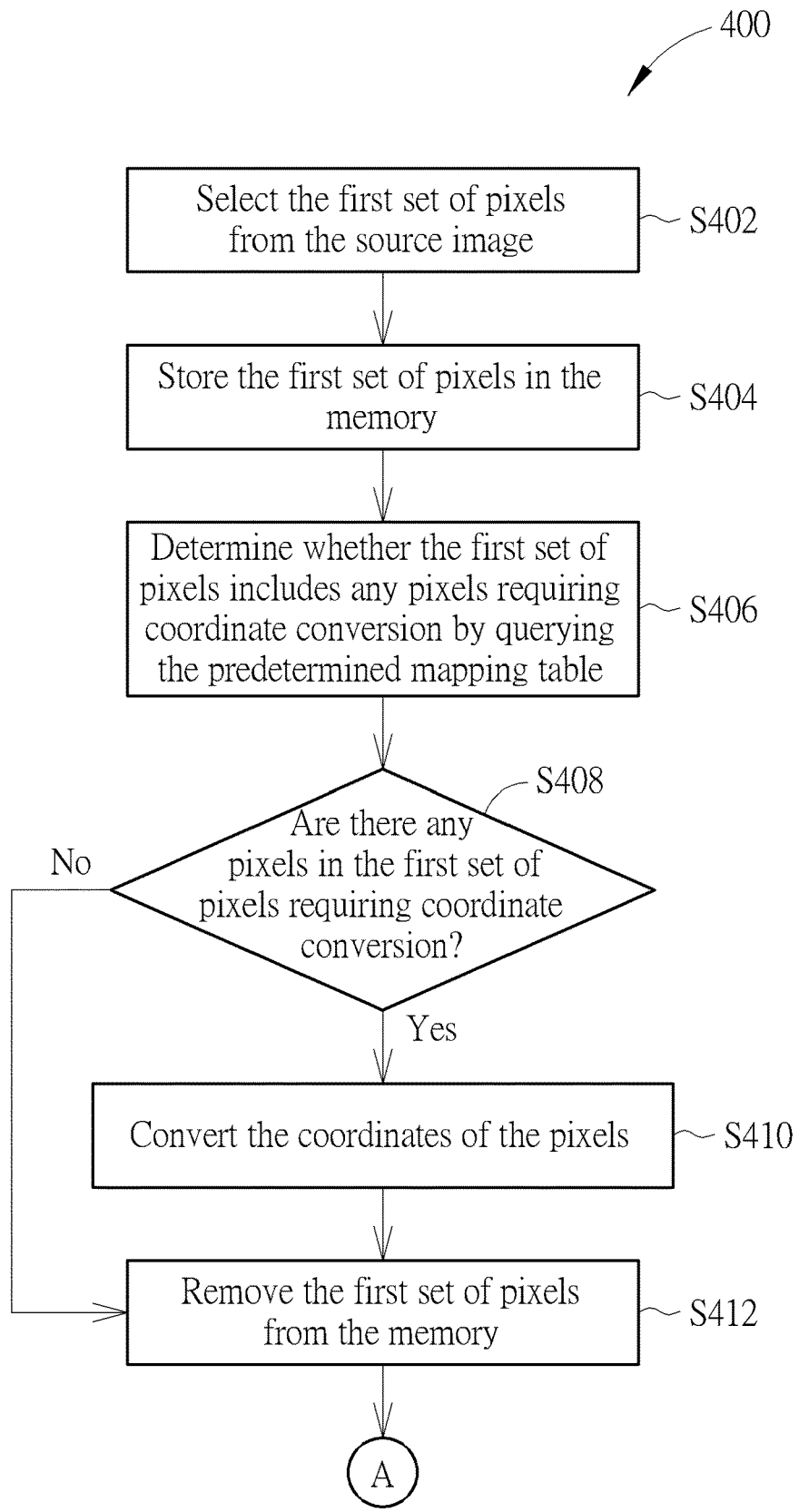
FIGS. 4A and 4B are flowcharts of an image conversion method.
Figure 4B:
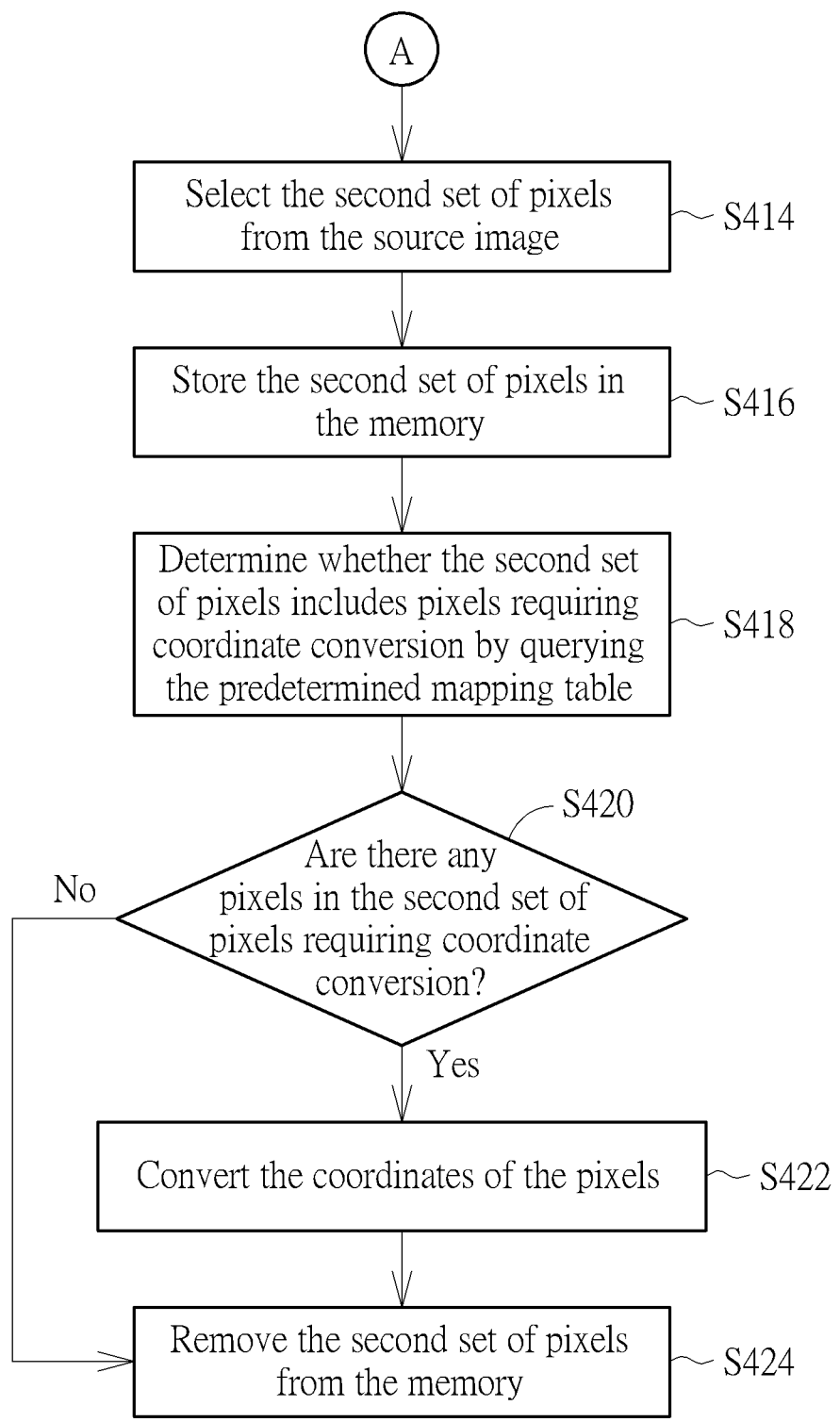

FIGS. 4A and 4B are flowcharts of an image conversion method 400. It includes the following steps:

S402: Select the first set of pixels from the source image;
S404: Store the first set of pixels in the memory;
S406: Determine whether the first set of pixels includes any pixels requiring coordinate conversion by querying the predetermined mapping table;
S408: If there are pixels in the first set of pixels requiring coordinate conversion, perform S410; if not, perform S412;
S410: Convert the coordinates of the pixels;
S412: Remove the first set of pixels from the memory;
S414: Select the second set of pixels from the source image;
S416: Store the second set of pixels in the memory;
S418: Determine whether the second set of pixels includes pixels requiring coordinate conversion by querying the predetermined mapping table;
S420: If there are pixels in the second set of pixels requiring coordinate conversion, perform S422; if not, perform S424;
S422: Convert the coordinates of the pixels; and
S424: Remove the second set of pixels from the memory.

The computer system can repeat the image conversion method 400 until all pixels requiring conversion in the source image are converted. The source image can be a video frame, and a set of pixels in the source image can be a column of pixels, a row of pixels, a block of pixels, or a single pixel. The memory can be a register and/or cache memory of the processor.

Figure 5:
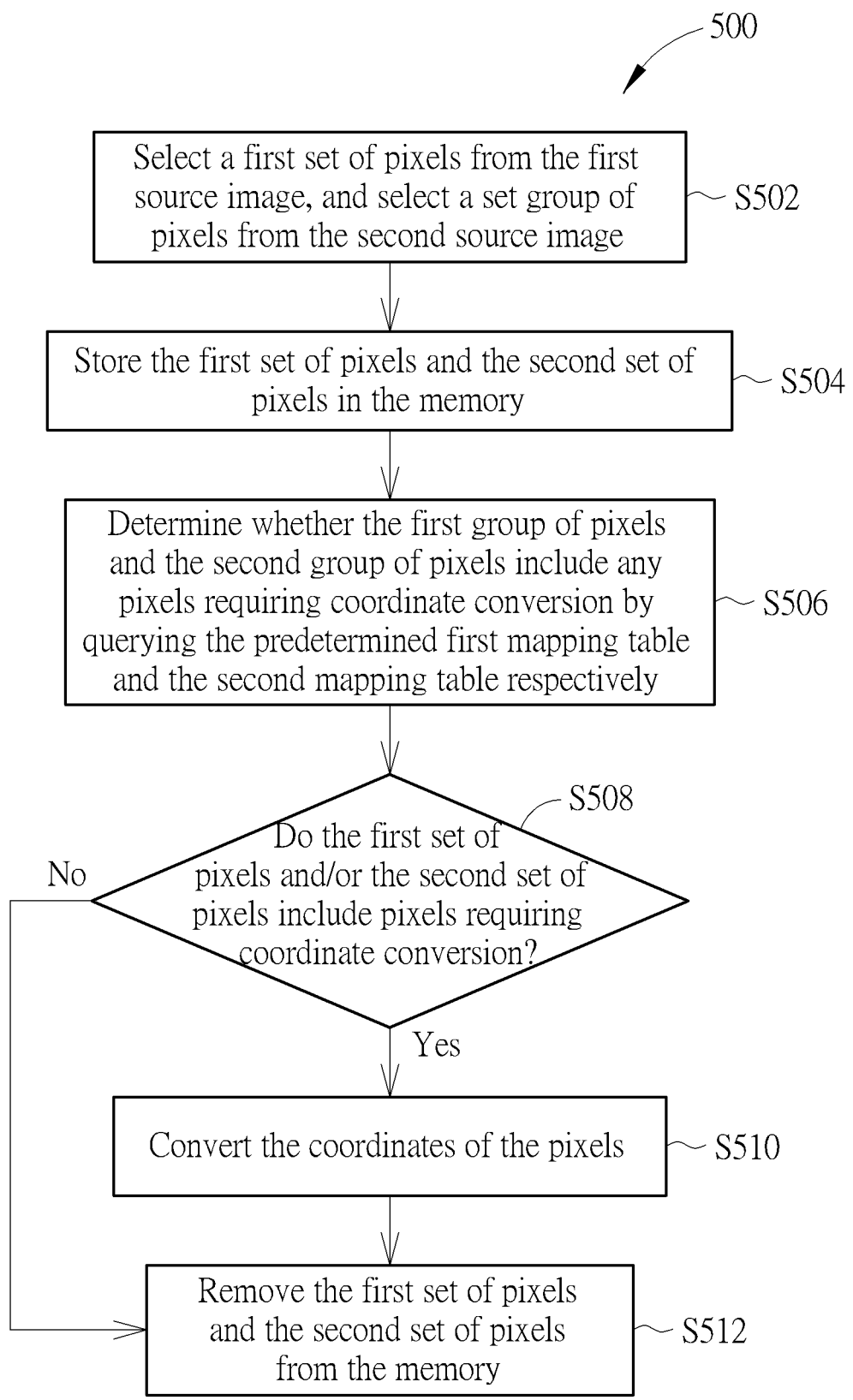
FIG. 5 is a flowchart of another image conversion method.

FIG. 5 is a flowchart of an image conversion method 500. It includes the following steps:

S502: Select a first set of pixels from the first source image, and select a set group of pixels from the second source image;
S504: Store the first set of pixels and the second set of pixels in the memory;
S506: Determine whether the first group of pixels and the second group of pixels include any pixels requiring coordinate conversion by querying the predetermined first mapping table and the second mapping table respectively;
S508: If the first set of pixels and/or the second set of pixels include pixels requiring coordinate conversion, perform S510; if not, perform S512;
S510: Convert the coordinates of the pixels; and
S512: Remove the first set of pixels and the second set of pixels from the memory.

Figure 6:
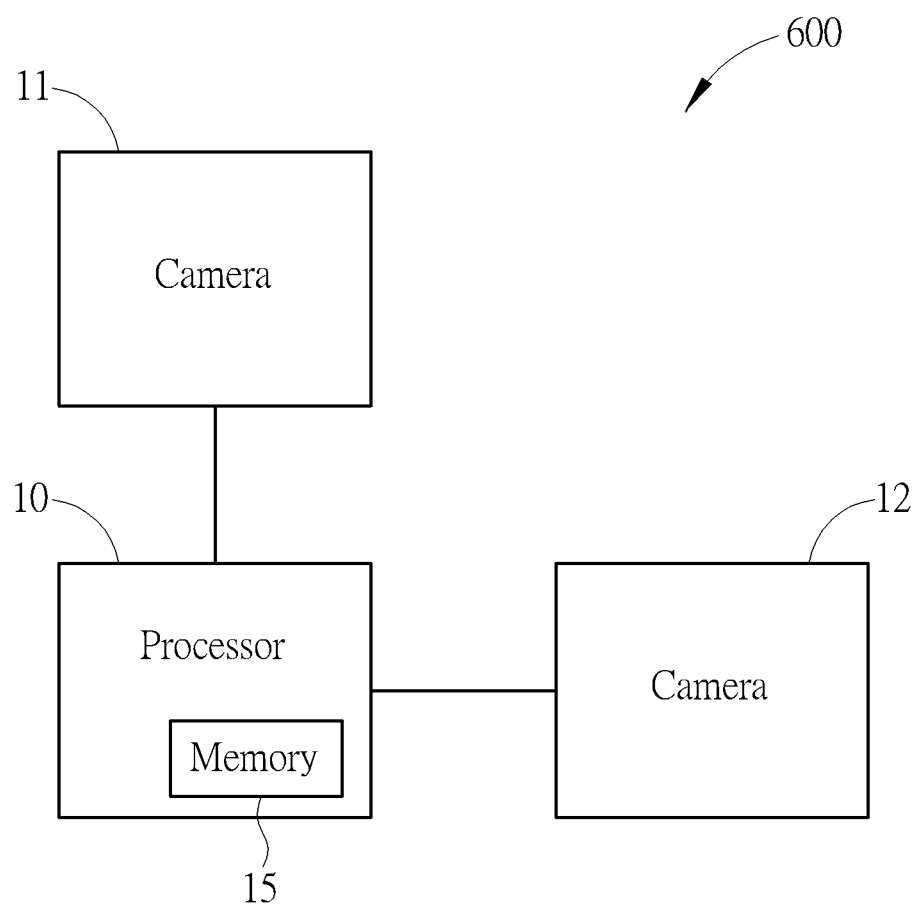
FIG. 6 is a diagram of an image processing system for performing image conversion of the embodiment.

FIG. 6 is a diagram of an image processing system 600 for performing image conversion of the embodiment. The image processing system 600 includes a processor 10, cameras 11 and 12. The processor 10 includes a memory 15. The camera 11 and the camera 12 may be any image capturing device. For example, the camera 11 and the camera 12 may have built-in lenses and photosensitive elements for capturing static or dynamic images. The processor 10 is coupled to the camera 11 and the camera 12 for performing image conversion. The processor 10 may be any form of data processing device, such as a central processing unit, a microprocessor, a microcontroller, etc. The memory 15 can be a register, a cache memory, or other forms of high speed memory for storing pixels to be processed.

In summary, the embodiment of the present invention divides the source image into sets of pixels, so that a set of pixel can be directly accessed from the processor's register and/or high speed cache memory, and be removed from the memory after the set of pixels is converted. In this way, the processor would not need to access lower speed memory, such as DRAM, during the image conversion process, so it does not need to consume computing resources to increase the hit rate of the cache memory. Therefore, it can increase the speed of accessing the image, reduce computational complexity, and improve the overall processing speed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of image conversion, comprising:
selecting a first set of pixels from a first source image;
storing the first set of pixels in a memory;
determining whether the first set of pixels comprises at least one first pixel requiring coordinate conversion by querying a first predetermined mapping table;
if the first set of pixels comprises the at least one first pixel requiring coordinate conversion, converting the coordinates of the at least one first pixel; and
after converting the coordinates of the at least one first pixel, removing the first set of pixels from the memory.

2. The method of claim 1, wherein converting the coordinates of the at least one first pixel is converting the coordinates of the at least one first pixel by querying the coordinate mapping table.

3. The method of claim 1, wherein converting the coordinates of the at least one first pixel is converting the coordinates of the at least one first pixel through a predetermined holography matrix.

4. The method of claim 1, further comprising:
selecting a second set of pixels from a second source image;
storing the second set of pixels in the memory;
determining whether the second set of pixels comprises at least one second pixel requiring coordinate conversion by querying a second predetermined mapping table;
if the second set of pixels comprises the at least one second pixel requiring coordinate conversion, converting the coordinates of the at least one second pixel; and
after converting the coordinates of the at least one second pixel, removing the second set of pixels from the memory.

5. The method of claim 4, wherein the coordinates of the at least one first pixel and the coordinates of the at least one second pixel are converted simultaneously.

6. The method of claim 1, further comprising:
after removing the first set of pixels from the memory, selecting a second set of pixels from the first source image;
storing the second set of pixels in the memory;
determining whether the second set of pixels comprises at least one second pixel requiring coordinate conversion by querying the first predetermined mapping table;
if the second set of pixels comprises the at least one second pixel requiring coordinate conversion, converting the coordinates of the at least one second pixel; and
after converting the at least one second pixel, removing the second set of pixels from the memory.

7. The method of claim 1, further comprising:
after removing the first set of pixels from the memory, selecting a second set of pixels from the first source image;
storing the second set of pixels in the memory;
determining whether the second set of pixels comprises at least one second pixel requiring coordinate conversion by querying the first predetermined mapping table;
if the second set of pixels does not comprise any second pixel requiring coordinate conversion, removing the second set of pixels from the memory.

8. The method of claim 1, wherein the first set of pixels is a column of pixels, a row of pixels, a block of pixels, or a pixel in the first source image.

9. The method of claim 1, wherein the memory is a register and/or a cache memory of a processor.

10. A method of image conversion, comprising:
selecting a first set of pixels from a first source image;
storing the first set of pixels in a memory;
determining whether the first set of pixels comprises at least one first pixel requiring coordinate conversion by querying a first predetermined mapping table;
if the first set of pixels does not comprise any first pixel requiring coordinate conversion, removing the first set of pixels from the memory.

11. The method of claim 10, further comprising:
after removing the first set of pixels from the memory, selecting a second set of pixels from the first source image;
storing the second set of pixels in the memory;
determining whether the second set of pixels comprises at least one second pixel requiring coordinate conversion by querying the first predetermined mapping table;
if the second set of pixels comprises the at least one second pixel requiring coordinate conversion, converting the coordinates of the at least one second pixel; and
after converting the at least one second pixel, removing the second set of pixels from the memory.

12. The method of claim 10, further comprising:
after removing the first set of pixels from the memory, selecting a second set of pixels from the first source image;
storing the second set of pixels in the memory;
determining whether the second set of pixels comprises at least one second pixel requiring coordinate conversion by querying the first predetermined mapping table;
if the second set of pixels does not comprise any second pixel requiring coordinate conversion, removing the second set of pixels from the memory.

13. The method of claim 10, wherein the first set of pixels is a column of pixels, a row of pixels, a block of pixels, or a pixel in the first source image.

14. The method of claim 10, wherein the memory is a register and/or a cache memory of a processor.

* * * * *